United States Patent Office 3,048,959
Patented Aug. 14, 1962

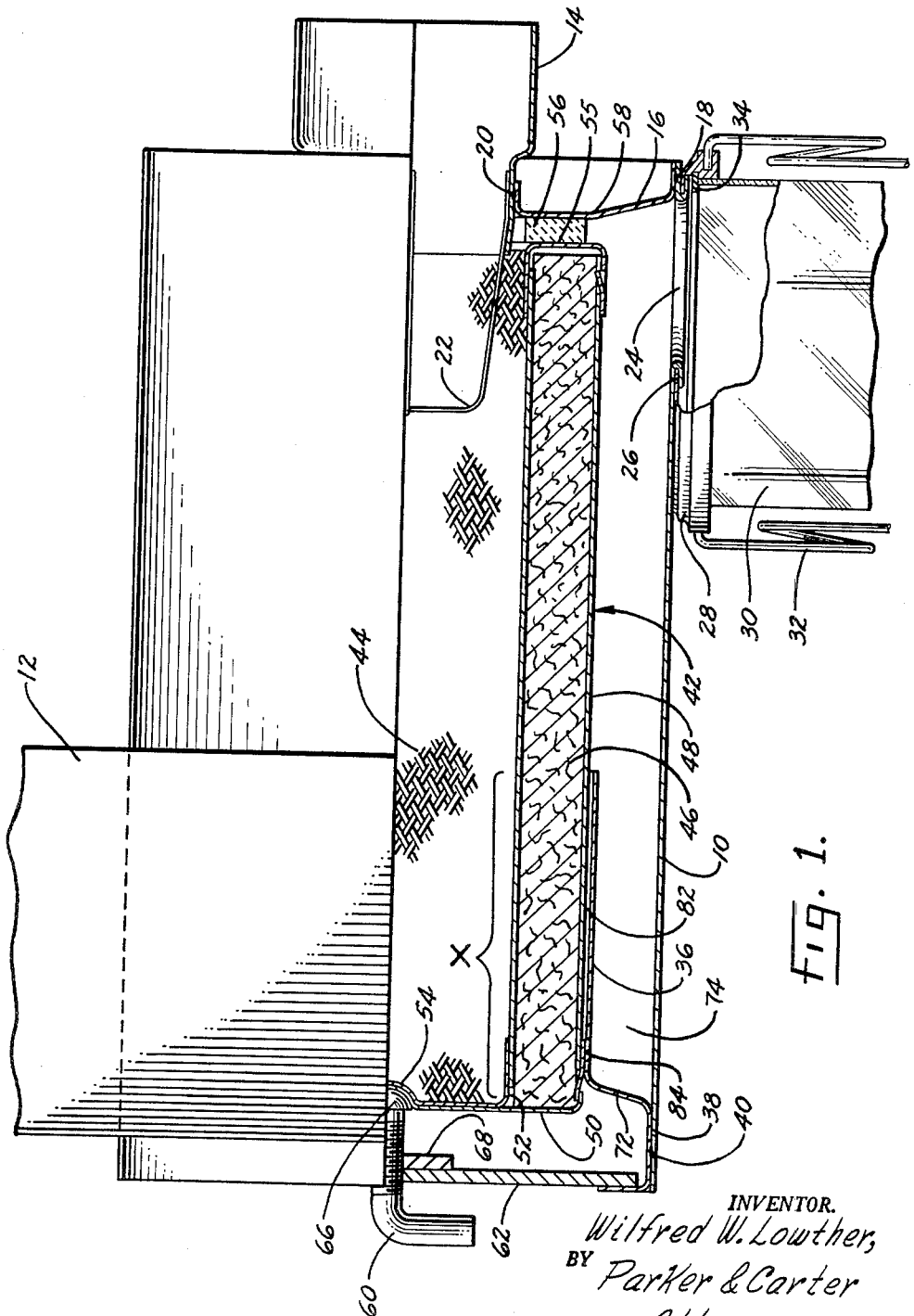

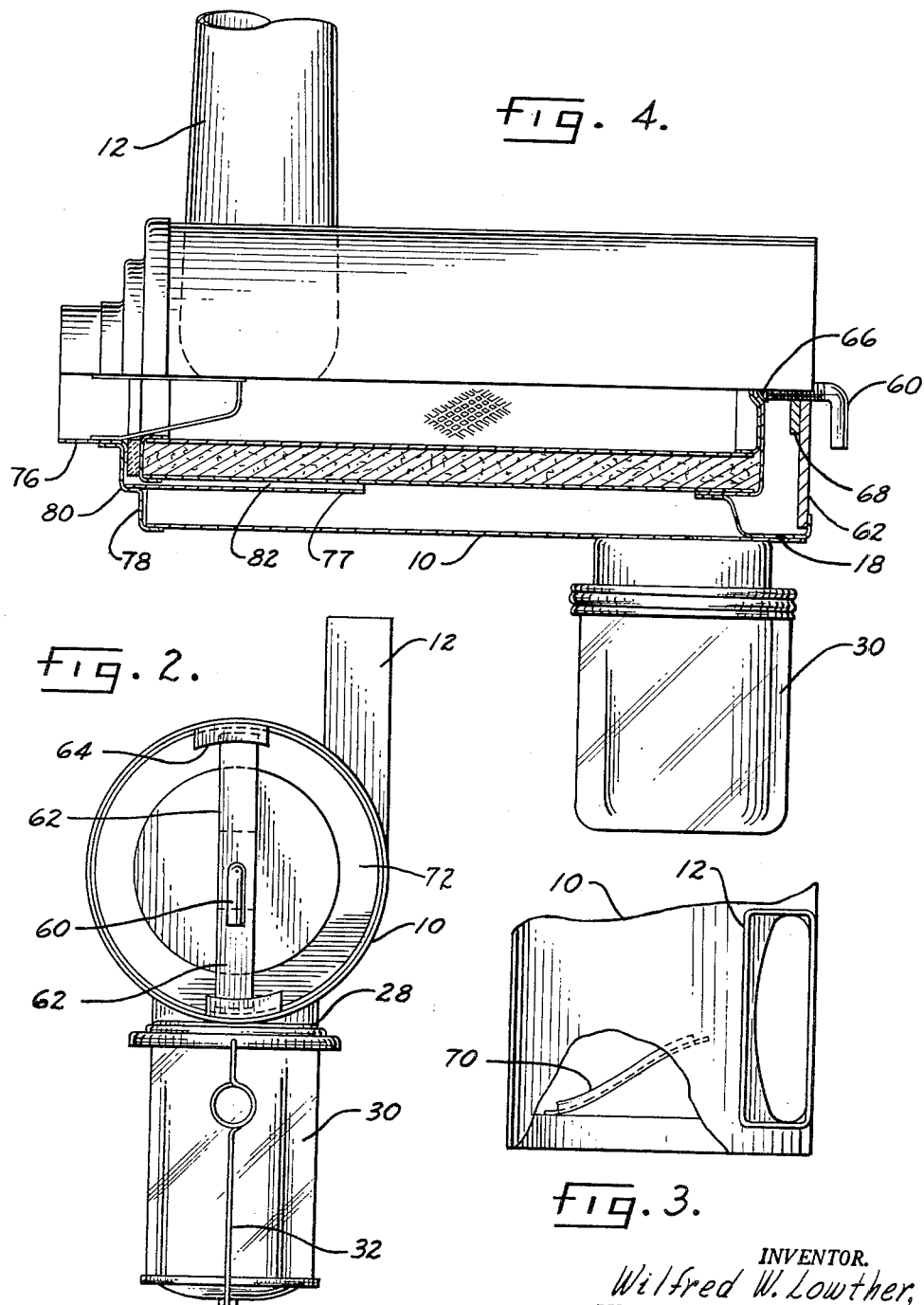

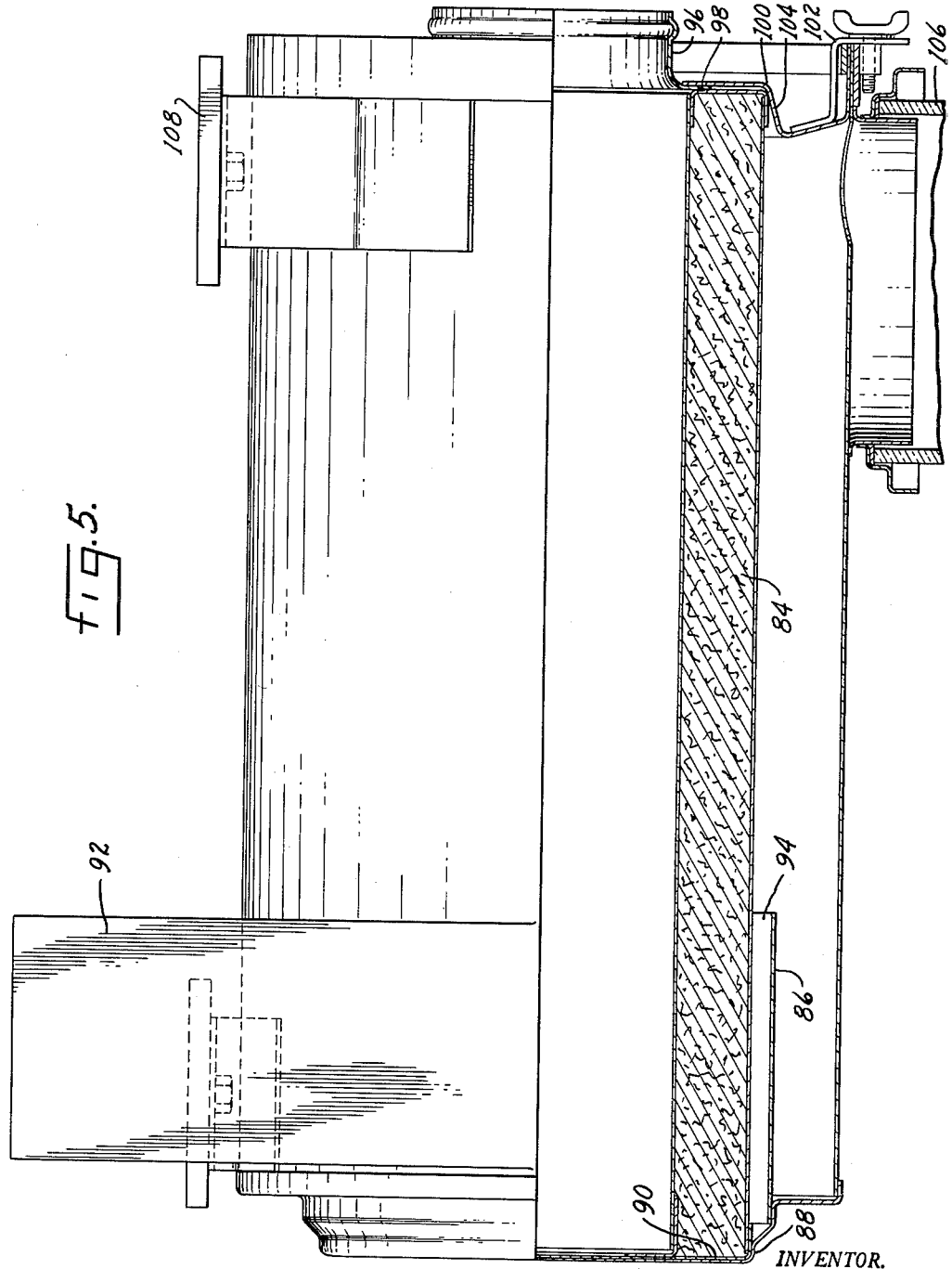

3,048,959
AIR CLEANING DEVICE AND METHOD
Wilfred W. Lowther, Chicago, Ill., assignor to Novo Industrial Corporation, a corporation of New York
Filed Oct. 27, 1959, Ser. No. 849,056
8 Claims. (Cl. 55—320)

This is a continuation-in-part of Serial No. 704,437, filed December 23, 1957, now abandoned.

This invention relates to air cleaners, and more particularly to air cleaners of the dry type.

One object of the invention is an air cleaner in which no liquids or fluids are used.

Another object is an air cleaner of the dry type in which the air inlet is tangentially disposed to the cleaner assembly so that the incoming air will helically spiral around the inside of the cleaner cover.

Another object is an air filter of the dry type in which the incoming air is centrifuged to remove dust.

Another object is an air cleaner of the dry type in which the incoming air goes through a plurality of filtering steps, each step removing different size dust particles.

Another object is an air cleaner of the dry type which utilizes a replaceable filter cartridge.

Another object is an all dry air cleaner with a highly efficient precleaner.

Another object is an all dry air cleaner constructed to use the full length of the filter cartridges.

Another object is an air cleaner of the dry type utilizing a replaceable cartridge having one end formed of a sealing material.

Another object is an all dry air cleaner which has a removable filter cartridge, but does not require any seals.

Another object is an air cleaner of the dry type in which the cleaner air outlet is sealed from the dust collecting zone.

Another object is an air cleaner in which the incoming air moves in a helical pattern from the inlet toward the outlet.

Another object is a guiding arrangement for aligning a replaceable cartridge in an air filter of the dry type.

Another object is an all dry air cleaner which has a high capacity and high efficiency.

Another object is a baffle or shield arrangement for an all dry air cleaner that insures that all of the filter cartridge will be used and, at the same time, masks the inlet to prevent the unit from clogging locally and guarantees proper orbiting.

Another object is an all dry air cleaner which does not require close tolerances in manufacture.

Other objects will appear in the ensuing specification, claims and drawings in which:

FIGURE 1 is a side elevation view of an air cleaner assembly, partly in section;

FIGURE 2 is an end view of FIGURE 1 on a reduced scale;

FIGURE 3 is a partial top plan view of FIGURE 1 with parts broken away, and on a reduced scale;

FIGURE 4 is a side elevation view of a modified form, partly in section;

FIGURE 5 is a side elevation view partly in section of a further modified form.

Referring to the drawings, and in particular to FIGURE 1, a cylindrical cover or housing 10 has a tangential air inlet 12 and a centrally or axially disposed air outlet 14. The inlet 12 is preferably positioned so that it is generally tangent to the cylindrical housing 10, as shown in FIGURE 2. By placing the inlet in this manner, the incoming air will flow into the cylindrical housing along the outer periphery or tangentially to the housing wall.

An annular end plate 16 has been shown fastened to the housing 10 at one end and may be welded, as at 18, or fastened in any suitable manner. An inner annular flange is welded or similarly secured, as at 20, to the outlet 14. The outlet 14 projects inside of the end plate 16 and has a wire type pilot member 22 projecting still farther into the interior of the assembly. The pilot 22 is used as a guide for aligning the filter cartridge, to be explained hereinafter.

The outlet end of the housing may be provided with a suitable opening or outlet 24 for dust or dirt. The edges of this slot or aperture are folded back or crimped, as at 26, to support a cover 28 of a dust collecting jar 30 supported by a suitable bale 32. The cover 28 might be welded, crimped, or otherwise suitably fastened to the housing. Interposed between the jar and the cover is a seal ring 34 or the like which seals against the upper edge of the jar and prevents air from leaking in.

The inlet end of the housing has a cylindrical shroud or shield 36, one end of which has been formed outwardly into a flange 38 and welded or otherwise suitably connected to the housing as at 40. The body of this shroud or shield projects into the housing and is concentric with the housing itself. It should be noted that the shield 36 is spaced from the inside of the housing and it is preferred that this spacing be uniform around the housing.

A filter cartridge, indicated generally at 42, is disposed in the housing and composed of a perforate metal or expanded metal or wire core or inner sleeve 44 surrounded by a suitable filter material 46. I have found that expanded metal is satisfactory as it has about 72% openings as compared to 50% openings in perforate metal. The filter material 46 may take a variety of forms and I have found pleated paper or polyurethane foamed plastic satisfactory. The density of the filter material may increase inwardly so that various stages of filtering intensity or action may be acquired. Suffice it to say that the details of the filter material itself are not essential for this invention.

The filter material may be surrounded by an outer perforate metal shield 48. One end of the cartridge is closed by an outer cap 50 with the center expanded metal core being closed by an inner cap 52. The two caps 50 and 52 may be offset, as at 54, to provide a socket. The other end of the cartridge may be fitted with an annular cap 55 which is connected to the inner and outer screens or shells and a seal or gasket 56 may be provided to bear against an abutment or flat surface 58 on the end cap 16 of the housing.

A screw or stud 60 may be threaded through a cross bale 62, the ends of which fit behind flanges or tabs 64 approximately 180° apart. It will be noted that these tabs 64 are formed on the outer end of the flange 38 which is part of the shield 36. The inner end of the stud or screw has a half-round 66 which fits in the depression 54 in the end of the filter cartridge. The inside of the cross arm 62 may be provided with a threaded back-up plate 68.

When the compression screw is in place with the cross arms behind the tabs 64, the screw may be turned. This will apply an axial thrust to the filter cartridge and will force the gasket or seal 56 into tight sealing engagement on the annular surface 58. The result is a tight rigid seal at the outlet 14.

To prevent dirt or dust from orbiting around the inlet end of the housing, I provide a dust ramp 70 which, as shown in FIGURE 3, is connected to the inner surface of the outer housing 10 and runs from the end wall 72 formed by the shield 36 a suitable distance down the inside of the housing and at a suitable angle. Thus, air entering the inlet and swirling tangentially in the space 74 between the housing 10 and shield 36 will be deflected to the right in FIGURE 1.

In FIGURE 4, I have shown a modified form in which the same numerals have been applied except as noted hereinbelow. However, the outlet, it will be noted, at 76, is directly next to the inlet 12. The shield 77 is next to the inlet 12. The shield again prevents the inlet air from going directly to and through the filter and the air ramp is used to deflect the dust and dirt to the right. The dust discharges through an opening to the dust jar 30. The end cap 78 on the left is offset, as at 80, to provide a socket or seat for the seal on the end of the filter element. In fact, the filter element in FIGURE 4 may be considered the same as the filter element in FIGURE 1, except reversed.

In both arrangements, the shield is spaced somewhat, as at 82, from the outside of the filter cartridge so that air may flow back up inside of the shield. Thus, the portion of the filter cartridge marked at X is fully usable.

In the form shown in FIGURE 5, the filter element 84 is inserted in the right end of the housing and extends inside of the shield 86 and is preferably seated in a socket 88 formed in the other end of the housing. The left end of the filter element is closed by an outer cap 90 which extends all the way across and is imperforate. As before, the shield 86 blocks or prevents the air from directly contacting the filter element from the inlet 92, but at the same time is spaced somewhat to provide a return annulus 94 so that the full length of the element will be used.

At the right end of the element the outlet 96 is connected to the end of the element by welding or the like, as at 98, and projects through a central opening in the end cap 100 which may be held on the outer housing by a plurality of clamps 102 or the like of any suitable type. The end cap is offset at 104 to provide a seat or pilot for the right end of the element.

In this embodiment the end cap 100 is in the form of a ring which fits over the clean air outlet 96. The left end of the filter element is completely sealed by cap 90. End cap 100 merely supports the right end of the element and also closes the end of the housing. But it does not form an air-tight seal since it only has a metal to metal contact with the element. But any air that leaks between the end cap 100 and the element must pass through the filter material of the element before it can get to the clean air outlet 96. Thus, no seals of any type are necessary and close tolerances are completely avoided. As before, the unit may have a suitable dust jar 106, mounting brackets 108, and air ramp, not shown.

The use, operation and function of the invention are as follows:

One of the problems with an air cleaner of this type is that the dirty air entering the inlet tends to flow directly through the filter element. A blasting or clogging action will take place and the dirt will pile up in the filter element on an uneven basis lengthwise. The shield 36 prevents this and the entering air will swirl in the space 74 and must move down the filter element before it can flow in. Thus, the dirt in the incoming air will make at least one complete turn or a major portion of a turn before it is exposed directly to the filter element. But by this time the dirt will have been centrifuged or thrown to the outside and will cling to the inner surface of the housing as it swirls down toward the dust jar. The shield also prevents the dirt from striking the inside of the housing after it comes through the inlet and rebounding directly into the filter element.

Additionally, the shield is spaced outwardly or away from the filter element so that the entire length of the filter element is usable. Thus, the filter element may be about the same length as the housing and is fully usable. The inlet does not have to have a separate chamber or inlet cavity of its own. Rather, the inlet may be attached or mounted on the side of the housing and is, therefore, within the housing's normal dimensions. It does not necessarily have to extend beyond either end. Since space in underhood tractor applications is important, this factor adapts this cleaner to a wide variety of uses.

Air to be cleaned is brought in through the tangential inlet 12 and a swirling motion is set up inside the housing. The air moves from left to right in FIGURES 1 and 4 but it could be reversed. The swirling or rotating air centrifuges the dirt to the outside and by both centrifugal force and gravity the dirt passes through opening 24 into the closed and sealed dust jar. This is a dry precleaner action and may remove up to as much as 90% to 95% of the dirt present in the air.

The remaining dust and dirt is removed when the air flows inwardly through the filter cartridge. The clean air then flows axially through the clean air outlet 14.

The dirty air is prevented from flowing directly to that portion of the filter cartridge, at X, opposite the inlet, thus preventing a blasting or clogging action. The shield 36 causes the air to go into a smooth tight helix or swirl and the dust ramp 70 may be used to force all dust into the pitch of the helical swirl. By the same token, the cleaner air is free to flow through any part of the entire length of the filter cartridge since the space 82 inside of the shield 36 is completely open.

The unit does not require close tolerances. The parts may be connected by simple spot welding. The screw 60 applies an axial thrust to the cartridge to seal the joint, at 56, at the clean air outlet. This, therefore, is the only connection that requires a seal. The sliding fit between the outside of the filter cartridge and the inside of the shield, as at 84, does not require a tight fit since any air leakage will immediately be picked up and entrained in the helical swirl.

The filter cartridge may be quickly and easily removed, cleaned and replaced. The pilot accurately guides the filter element back to its position in the housing. The pilot 22, since it is made of wire, will not collect dust and dirt, settled by gravity.

The ramp 70 is important since it prevents any dirt and dust from entraining itself next to the wall 72 of the shield and staying there in orbit. Any dirt entering the inlet will be deflected by the ramp and will move toward the jar. Since the dirt is thrown centrifugally to the outside, the ramp is attached to the inner surface of the housing. Therefore, the inner edge of the ramp does not need to be attached to the shield.

Without the ramp, a portion of the air will entrain itself against the inside of the housing next to the end wall and dust will collect and merely orbit without being picked up by the helical swirl. The orbiting dust will grind itself down to a fine powder of a size that it will go through the filter element. But the ramp deflects all the air from the inlet and projects it smoothly into a helical swirl toward the outlet.

The dust in the inlet air should be entrained in a helical swirl of sufficient distance so that an accurate separation will take place. It is important that the dust and air complete a sufficient portion of a turn while in the helical swirl to centrifuge the dust to the outside. This can be established by a proportion or relationship between the diameter of the housing and its length. For example, if the housing is 5 inches in diameter and approximately 12 inches long, the helical swirl will have a pitch angle of approximately 55 degrees which will insure that the dust and air will execute slightly more than a revolution in moving the full length of the housing. However, this is only an example and the relationship between the length and diameter should be about 1½–1 for the shortest and 4–1 for the longest. Anything less than 1½–1 will have the dust and air in the helical swirl for too short a time for substantially all of the dust in the concentric strata of the annular air space to progress to the outside. In short, there will not be sufficient time to fully centrifuge the dust. Anything in excess of 4–1 is surplusage and will only cause the housing to be excessively long, thereby taking up unnecessary space.

While I have shown and described the preferred form and one modification of my invention, it should be understood that additional modifications, changes, substitutions and alterations may be made without departing from the invention's fundamental theme. Therefore, I wish that the invention be unrestricted, except as by the appended claims.

I claim:

1. In an air cleaning assembly, a generally cylindrical housing having an inlet at one end for dirty air constructed to set up a helical swirling motion of the air in the housing to centrifuge the dust to the outside, a generally cylindrical annular filter element centrally disposed in the housing and of a diameter substantially less than the diameter of the housing so that a helical swril zone for air and dust is provided between the outside of the filter element and the inside of the housing, a dust port in the housing at the other end thereof for tangentially discharging dust, a centrally arranged clean air outlet in the housing communicating with the interior of the annular filter element, a shield in the housing extending from the said one end and masking the inlet, the shield extending no more than half the length of the housing and terminating in substantial spaced relation to the other end of the housing, the shield being disposed between the filter element and the inside of the housing and spaced from each so that dirty inlet air will be deflected from direct contact with the filter element at the inlet, and at the same time, the portion of the filter element masked by the shield will be usable, the filter element being axially removable through the end of the housing opposite the clean air outlet and further including a pilot mounted on the clean air outlet and projecting into the interior of the housing and constructed to project into the inside of the annular filter element when the filter element is fully mounted in the housing so that the pilot serves to position the inner end of the filter element, an annular sealing surface around the pilot, a seal ring between the annular sealing surface and the inner end of the filter element, and manually operable means at the other end of the housing for clamping the filter element in place and for applying an axial thrust thereto to provide a tight seal between the filter element and the annular sealing surface at the clean air outlet.

2. In an air cleaning assembly, a generally cylindrical housing having an inlet at one end for dirty air constructed to set up a helical swirling motion of the air in the housing to centrifuge the dust to the outside, a generally cylindrical annular filter element centrally disposed in the housing and of a diameter substantially less than the diameter of the housing so that an annular swirl zone for air and dust is provided between the outside of the filter element and the inside of the housing, a dust port in the housing at the other end thereof for discharging dust, a centrally arranged clean air outlet in the housing communicating with the interior of the annular filter element, the filter element being axially removable through the end of the housing opposite the clean air outlet, piloting structure at the clean air outlet end of the housing to centrally position the clean air outlet end of the filter element when the filter element is fully mounted in the housing, an annular sealing surface generally concentric with the piloting structure, a seal ring between the annular sealing surface and the clean air outlet end of the filter element, and manually operable means at the other end of the housing for clamping and applying an axial thrust between the filter element and housing to thereby provide a tight seal between the filter element and the clean air outlet.

3. The structure of claim 2 further characterized in that the piloting structure includes a pilot mounted on the clean air outlet and projecting into the interior of the housing and constructed to project into the inside of the annular filter element.

4. In an air cleaning assemby, a generally cylindrical housing having an inlet at one end for dirty air constructed to set up a helical swirling motion of the air in the housing to centrifuge the dust to the outside, a generally cylindrical annular filter element centrally disposed in the housing and extending approximately the full length thereof and of a diameter substantially less than the diameter of the housing so that a helical swirl zone for air and dust is provided between the outside of the filter element and the inside of the housing, a dust port in the housing at the other end thereof for tangentially discharging dust, a centrally arranged clean air outlet in the housing communicating with the interior of the annular filter element, and a shield in the housing extending from the said one end and masking the inlet, the shield extending no more than half the length of the filter element and terminating in substantial spaced relation to the other end of the housing, the shield being disposed between the filter element and the inside of the housing and spaced from each so that dirty inlet air will be deflected from direct contact with the filter element at the inlet, and at the same time, the portion of the filter element masked by the shield will be usable.

5. The structure of claim 4 further characterized in that the shield is continuous in the form of a sleeve and extends all the way around the filter element.

6. In an air cleaning assembly, a generally cylindrical housing having a tangentially disposed inlet at one end for dirty air to set up a helical swirling motion of the air in the housing to centrifuge the dust to the outside, an end wall otherwise closing the said one end of the housing, a generally cylindrical annular filter element centrally disposed in the housing and of a diameter substantially less than the diameter of the housing so that an annular swirl zone for air and dust will be provided between the outside of the filter element and the inside of the housing, a dust port in the housing at the other end thereof for discharging dust, a centrally disposed clean air outlet in the housing in communication with the inside of the filter element, and a dust ramp disposed on a diagonal against the inside of the housing extending from the end wall an axial distance no greater than the axial length of the inlet.

7. The structure of claim 6 further characterized by and including a shield in the housing extending from the end wall and masking the inlet, the dust ramp being disposed between the outside of the shield and the inside of the housing.

8. In an air cleaner assembly, a generally cylindrical housing having an inlet at one end for dirty air, a generally cylindrical annular filter element generally centrally disposed in the housing and of a diameter substantially less than the inside diameter of the housing so that an annular swirl zone for dirt and dust is provided between the outside of the filter element and the inside of the housing, means for guiding the inlet air into a helical swirling motion in the swirl zone to centrifuge the dust therein to the outside, a dust discharge from the swirl zone at the other end of the housing from the inlet for discharging dust, a centrally arranged clean air outlet in the housing communicating with the interior of the annular filter element and projecting to the outside of the housing, the filter element being axially removable through the end of the housing opposite the clean air outlet, a pilot structure at the clean air outlet end of the housing constructed to generally centrally position the clean air outlet end of the filter element in the housing when the filter element is fully mounted therein, an annular sealing surface generally concentric with the pilot structure, a seal ring between the annular sealing surface and the clean air outlet end of the filter element, and manually operable means manipulatable at the other end of the housing for fastening the filter element in the housing and also for applying an axial thrust between the filter element and the housing to thereby provide a tight seal between the filter element and the clean air outlet.

References Cited in the file of this patent

UNITED STATES PATENTS

| | | |
|---|---|---|
| 1,665,434 | Bennett | Apr. 10, 1928 |
| 1,712,947 | Blair | May 14, 1929 |
| 2,010,456 | Jones | Aug. 6, 1935 |
| 2,226,045 | Baldwin | Dec. 24, 1940 |
| 2,692,655 | Peeps | Oct. 26, 1954 |

FOREIGN PATENTS

| | | |
|---|---|---|
| 247,958 | Switzerland | Apr. 15, 1947 |
| 990,710 | France | June 13, 1951 |
| 1,071,848 | France | Mar. 10, 1954 |
| 145,259 | Sweden | May 11, 1954 |
| 201,047 | Austria | Dec. 10, 1958 |